(12) United States Patent
Nakao et al.

(10) Patent No.: US 7,355,805 B2
(45) Date of Patent: Apr. 8, 2008

(54) MAGNETIC TAPE AND METHOD OF MANUFACTURING MAGNETIC TAPE, SERVO WRITER, AND METHOD OF AND APPARATUS FOR SPECIFYING SERVO BAND

(75) Inventors: Toru Nakao, Kanagawa (JP); Takahisa Izumida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/823,675

(22) Filed: Apr. 14, 2004

(65) Prior Publication Data

US 2004/0207943 A1  Oct. 21, 2004

(30) Foreign Application Priority Data

Apr. 15, 2003  (JP) .............................. 2003-110504

(51) Int. Cl.
G11B 5/09 (2006.01)
G11B 5/02 (2006.01)
G11B 5/584 (2006.01)
(52) U.S. Cl. ...................... 360/48; 360/55; 360/77.12
(58) Field of Classification Search ..................... None
See application file for complete search history.

(56) References Cited

U.S. PATENT DOCUMENTS

| | | | |
|---|---|---|---|
| 5,353,176 A * | 10/1994 | Kosuge ........................ 360/63 |
| 5,689,384 A * | 11/1997 | Albrecht et al. ......... 360/77.12 |
| 5,898,533 A * | 4/1999 | Mantey et al. ................ 360/48 |
| 5,930,065 A | 7/1999 | Albrecht et al. |
| 5,946,156 A * | 8/1999 | Schwarz et al. .............. 360/75 |
| 5,963,400 A * | 10/1999 | Cates et al. ................. 360/317 |
| 5,982,711 A * | 11/1999 | Knowles et al. ......... 360/77.12 |
| 6,031,673 A * | 2/2000 | Fasen et al. ................... 360/53 |
| 6,122,124 A * | 9/2000 | Fasen et al. ................... 360/51 |
| 6,124,996 A * | 9/2000 | Fasen et al. ................... 360/51 |
| 6,169,640 B1 * | 1/2001 | Fasen ........................... 360/48 |
| 6,330,123 B1 * | 12/2001 | Schwarz et al. .............. 360/75 |
| 6,433,949 B1 * | 8/2002 | Murphy et al. ............... 360/75 |
| 6,563,659 B1 * | 5/2003 | Fasen ........................... 360/71 |
| 6,580,581 B1 * | 6/2003 | Bui et al. ................. 360/78.02 |
| 6,710,967 B2 * | 3/2004 | Hennecken et al. ..... 360/77.12 |
| 6,791,781 B2 * | 9/2004 | Bui et al. .................. 360/72.2 |
| 6,937,413 B2 * | 8/2005 | Bui et al. ...................... 360/48 |
| 6,940,682 B2 * | 9/2005 | Bui et al. ................. 360/77.12 |

* cited by examiner

*Primary Examiner*—William Korzuch
*Assistant Examiner*—Daniell L. Negrón
(74) *Attorney, Agent, or Firm*—Sughrue Mion, PLLC

(57) ABSTRACT

Data for specifying servo bands SB1 to SB5 is embedded in each servo signal S1 to S5 that is written on a plurality of servo bands SB1 to SB5 formed on a magnetic tape MT.

31 Claims, 8 Drawing Sheets

FIG. 2
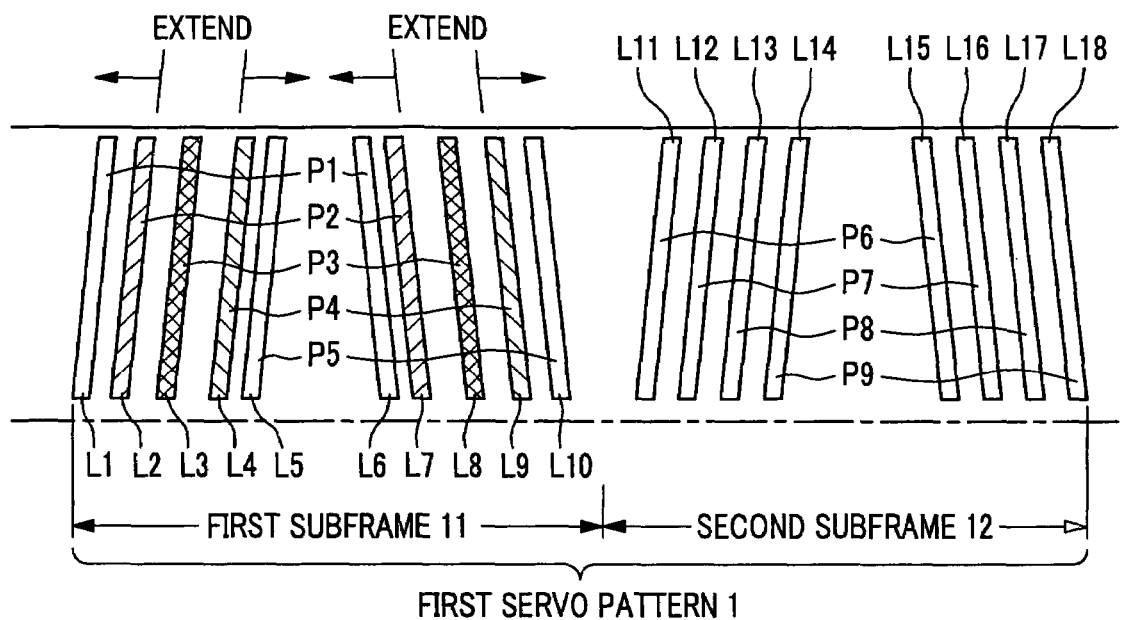
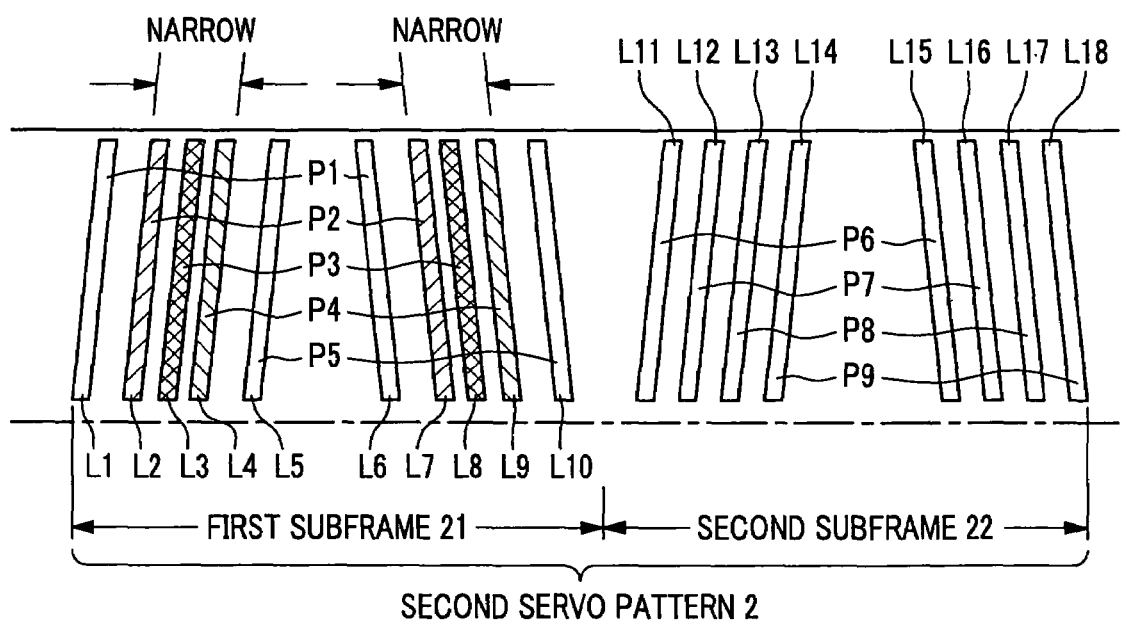

FIG. 8
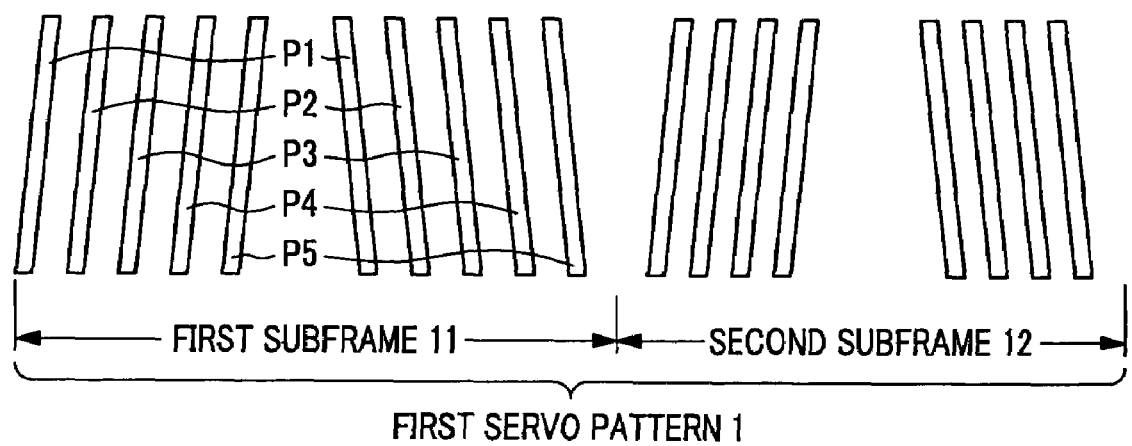
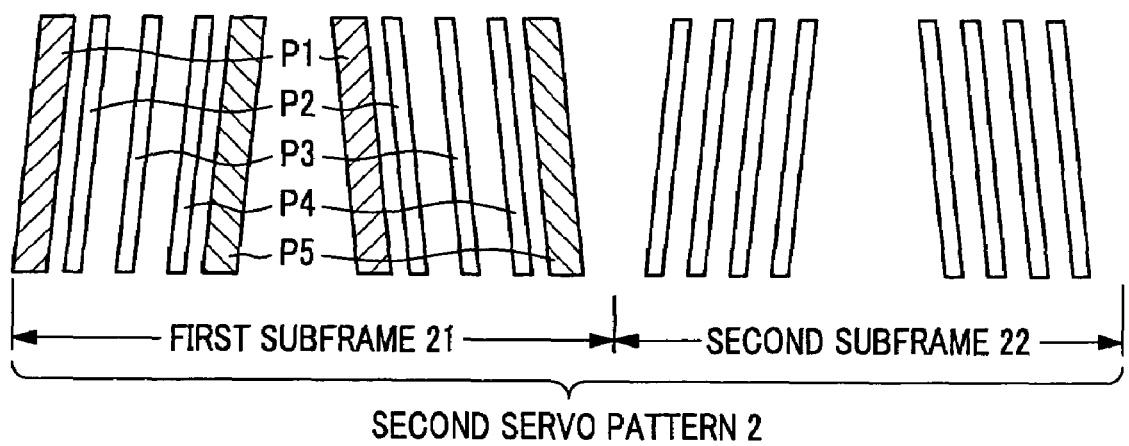

MAGNETIC TAPE AND METHOD OF MANUFACTURING MAGNETIC TAPE, SERVO WRITER, AND METHOD OF AND APPARATUS FOR SPECIFYING SERVO BAND

BACKGROUND OF THE INVENTION

The present invention relates to a magnetic tape, method of manufacturing the magnetic tape, servo writer, and method of and apparatus for specifying a servo band, which contribute to specify a servo band formed on a magnetic tape.

In recent years, in order to highly accurately read out data that is recorded with high recording density from magnetic tapes such as used for backing up data of a computer system, servo signals have been recorded on a plurality of servo bands adjacent to a plurality of data tracks that are formed along a longitudinal direction of the magnetic tape. In this kind of magnetic tape, for the purpose of accurately tracing the position where the magnetic head records/reproduces on a data track, it is very important to specify which of a plurality of servo bands arranged along the width of the magnetic tape does the magnetic head positions. In a conventional method, such as disclosed in Japanese Laid-open Patent Application No.11-273040 (paragraph [0027] and FIG. 6), servo patterns of adjacent servo bands are offset along the longitudinal direction of the magnetic tape, and signals of these servo bands are read out simultaneously to compare and specify the servo band where the magnetic head positions.

However, the above conventional method requires to simultaneously compare the adjacent servo bands, which results in a drawback in that specifying the servo band can not be performed, for example, when one of the servo signals is not readout temporally or permanently due to blocking or clogging of the magnetic head. Further, because it is necessary to simultaneously compare the adjacent servo bands, a plurality of servo signal read-out elements and signal-processing circuits are necessary.

Upon writing an offset servo pattern, it is necessary to write a servo pattern on a servo band in an accurately offset manner with respect to the other servo pattern written on the reference servo band. For this reason, a gap has to be formed in an accurate position of the servo write head in accordance with the offset along the longitudinal direction of the magnetic tape. This leads to an increase in cost for manufacturing the magnetic head.

With the foregoing drawback of the prior art in view, the present invention seeks to provide a magnetic tape, method of manufacturing a magnetic tape, a servo writer, method of and apparatus for specifying a servo band, wherein specifying a servo band where the magnetic head positions can be performed without comparing servo signals written on adjacent servo bands.

SUMMARY OF THE INVENTION

According to the present invention, there is provided a magnetic tape comprising: a plurality of servo bands on which are written servo signals for tracking control of a magnetic head, wherein data is embedded in a servo signal written on one of the servo bands, and the data is for specifying the servo band where the servo signal positions.

In this construction of the magnetic tape, because data is embedded in a servo signal written on one of the servo bands and the data is for specifying the servo band where the servo signal positions, it is possible to specify the servo band where the servo signal positions without the necessity of comparing with another servo signal on other servo bands.

In the aforementioned magnetic tape, the servo signal may consist of a plurality of continuous patterns sets each of which pattern is nonparallel stripes, and the data may be embedded in the servo signal by shifting a pair of nonparallel stripes along the longitudinal direction of the magnetic tape.

In this construction of the magnetic tape, it is possible to embed the data for specifying the servo band into a servo signal written on one of the servo bands by way of shifting a pair of nonparallel stripes which forms a part of the continuous patterns set.

In the aforementioned magnetic tape, the servo signal may consist of a plurality of continuous patterns sets each of which pattern is nonparallel stripes, and the data may be embedded in the servo signal by varying a width of a pair of nonparallel stripes.

In this construction of the magnetic tape, it is possible to embed the data for specifying the servo band into a servo signal only by varying the width of a pair of nonparallel stripes.

In the aforementioned magnetic tape, the servo signal may consist of a plurality of continuous patterns sets each of which pattern is nonparallel stripes, and the data may be embedded in the servo signal by changing a spacing interval between adjacent continuous patterns sets.

In this construction of the magnetic tape, it is possible to embed the data for specifying the servo band into a servo signal only by changing the spacing interval between adjacent subframes.

In the aforementioned magnetic tape, the servo bands may be previously DC erased.

This construction of the magnetic tape can improve the signal-to-noise ratio of the read out servo signal, and the servo band information embedded in the servo signal can be read out in a reliable manner.

According to the present invention, there is also provided a method of specifying a servo band from a plurality of servo bands formed on a magnetic tape, comprising the steps of: reading data that is embedded in a servo signal written on one of the servo bands for specifying the servo band where the servo signal positions; and specifying the servo band where the servo signal positions based on the data.

In this construction of the servo band specifying method, in a magnetic tape recording/reproducing apparatus, the servo read head for reading servo signals reads out a servo signal written on one servo band, and decodes the data embedded in the servo signal. Based on the decoded data, the servo band where the servo read head currently positions can be specified without the necessity of comparing with another servo signal written on the adjacent servo band.

In the aforementioned servo band specifying method, the servo signal may consist of a plurality of continuous patterns sets each of which pattern is nonparallel stripes, and the data may be embedded in the servo signal by shifting a pair of nonparallel stripes along the longitudinal direction of the magnetic tape.

In the aforementioned servo band specifying method, the servo signal may consist of a plurality of continuous patterns sets each of which pattern is nonparallel stripes, and the data may be embedded in the servo signal by varying a width of a pair of nonparallel stripes.

Also, in the aforementioned servo band specifying method, the servo signal may consist of a plurality of continuous patterns sets each of which pattern is nonparallel stripes, and the data may be embedded in the servo signal by changing a spacing interval between adjacent continuous patterns sets.

Further, in the aforementioned servo band specifying method, the servo bands may be previously DC erased.

Furthermore, in the aforementioned servo band specifying method, specifying the servo band may be carried out only by reading one servo band.

In this servo band specifying method, specifying the servo band can be carried out only by reading one servo band. Therefore, it is not necessary to compare with another servo signal written on the adjacent servo band.

According to the present invention, there is also provided an apparatus for specifying a servo band from a plurality of servo bands formed on a magnetic tape, comprising: a servo read head for reading a servo signal written on one of the servo bands; and a servo band specifying section for specifying, from the servo signal written on one of the servo bands to be read out by the servo read head, a servo band where the servo signal positions.

In this construction of the apparatus for specifying a servo band, the servo read head reads a servo signal written on one servo band, and based on the servo signal, the servo band specifying section specifies the servo band where the servo signal positions. Therefore, unlike the conventional apparatus, the servo band where the servo read head currently positions can be specified without the necessity of comparing with another servo signal written on the adjacent servo band.

In the aforementioned apparatus for specifying a servo band, specifying the servo band may be carried out only by reading one servo band.

In this apparatus for specifying a servo band, specifying the servo band can be carried out only by reading one servo band. Therefore, it is not necessary to compare with another servo signal written on the adjacent servo band.

According to the present invention, there is also provided a method of manufacturing the aforementioned magnetic tape comprising: a first step of encoding data for specifying a servo band where the servo signal positions: a second step of converting the data that is encoded in the first step into a recording pulse current; and a third step of supplying the recording pulse current to the servo write head and writing on the servo band of the magnetic tape a servo signal in which is embedded the encoded data.

In this construction of the magnetic tape manufacturing method, the data for specifying a servo band where the servo signal positions is encoded in the first step, and the encoded data is then converted into a recording pulse current in the second step. In the third step, when the recording pulse current is supplied to the servo write head and a servo signal written on the servo band of the magnetic tape, the encoded data which is for specifying the servo band where the servo signal positions can be embedded in this servo signal.

According to the present invention, there is further provided a servo writer used for manufacturing the aforementioned magnetic tape comprising: a magnetic tape running mechanism for taking up with a take-up reel the magnetic tape that is fed out from a supply reel; a servo write head for writing a servo signal on a servo band of the magnetic tape in a manner contacting with the magnetic tape while the magnetic tape is running; a controller for encoding data for specifying a servo band where the servo signal positions; and a pulse generation circuit for converting the encoded data outputted from the controller into a recording pulse current, and for supplying the recording pulse current to a coil of the servo write head.

In this construction of the servo writer, the controller encodes the data for specifying a servo band where the servo signal positions, the pulse generation circuit converts the encoded data into a recording pulse current. When a servo signal is written on a servo band of the magnetic tape by supplying the recording pulse current to the coil of the servo write head, the data for specifying the servo band can be embedded in this servo signal.

BRIEF DESCRIPTION OF THE DRAWINGS

Preferred embodiments of the present invention will be described below, by way of example only, with reference to the accompanying drawings, in which:

FIG. 2 is an enlarged plan view showing a servo signal of FIG. 1;

FIG. 8 is an enlarged plan view showing another embodiment of a servo signal according to the present invention.

DETAILED DESCRIPTION OF THE INVENTION

Figure 1:
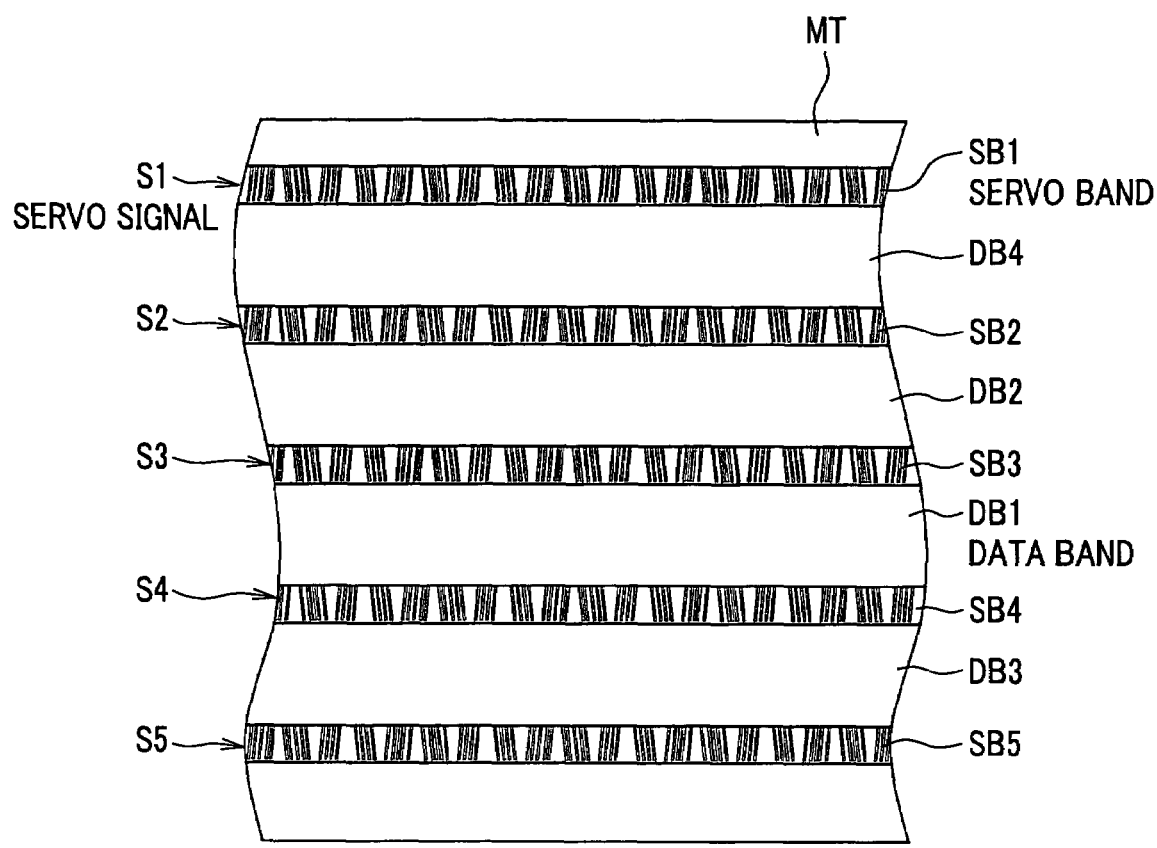
FIG. 1 is a plan view illustrating a magnetic tape according to the present invention.

With reference to the accompanying drawings, a magnetic tape, and method of manufacturing the magnetic tape, a servo writer, method of and apparatus for specifying a servo band where a servo signal positions, and method of embedding data according to the present invention will be described in detail. With reference to FIGS. 1 and 2, description will be given firstly for servo signals S1 to S5 which are written on a magnetic tape MT As shown in FIG. 1, a magnetic tape MT includes five servo bands SB1 to SB5 along the longitudinal direction of the tape. The servo bands SB1 to SB5 are positioned at equally spaced intervals along the width direction of the tape. Arranged between the servo bands SB1 to SB5 are data bands DB1 to DB4. A predetermined servo signal S1 to S5 for tracking control of the magnetic head is written on each servo band SB1 to SB5.

As seen in FIG. 2, the servo signal S1 to S5 consists of a first servo pattern 1 and a second servo pattern 2, which are arbitrarily arranged for a plurality sets along the longitudinal direction of the tape. The first servo pattern 1 includes a first subframe 11 and a second subframe 12 as nonparallel stripes, and the second servo pattern 2 also includes a first subframe 21 and a second subframe 22 as nonparallel stripes.

The first subframe 11, 21 includes five line patterns L1 to L5 which incline against the longitudinal direction of the tape, and five line patterns L6 to L10 which incline symmetrically to the line patterns L1 to L5, so as to form nonparallel pattern pairs. These line patterns L1 to L10 are formed by a pair of nonparallel gap pattern G (FIG. 6) to be described later, so that the intervals of each pair of line patterns (L1, L6), (L2, L7), (L3, L8), (L4, L9), and (L5, L10) from the left side of the figure are equal to the distance of the gap pattern G. For the purpose of explanation, the pairs of line patterns (L1, L6) to (L5, L10) are referred to, from the left side, as a first nonparallel pattern P1, a second nonparallel pattern P2, a third nonparallel pattern P3, a fourth nonparallel pattern P4, and a fifth nonparallel pattern P5.

In the first subframe 11 of the first servo pattern 1, the second nonparallel pattern P2 and the fourth nonparallel pattern P4 are spaced apart with respect to the third nonparallel pattern P3. In the first subframe 21 of the second servo pattern 2, the second nonparallel pattern P2 and the fourth nonparallel pattern P4 are close to the third nonparallel pattern P3.

The second subframe 12, 22 includes four line patterns L11 to L14 which incline against the longitudinal direction of the tape, and four line patterns L15 to L18 which incline symmetrically to the line patterns L11 to L14. The nonparallel patterns P6 to P9 which consist of the line patterns L11 to L18 are arranged at equally spaced intervals along the longitudinal direction of the tape. The line patterns may have any shape as long as they form a plurality pairs of nonparallel patterns.

As described above, the first subframes 11, 21 of the first servo pattern 1 and the second servo pattern 2 are formed differently so that the data indicating "1" is embedded in the first servo pattern 1 and the data indicating "0" is embedded in the second servo pattern 2. With arbitrary arrangement of these first and second servo patterns 1, 2 along the longitudinal direction of the tape, it is possible to read out a predetermined data, upon reading out, for example, the whole servo signal S1.

As one example of data structure embedded in the whole servo signal S1, the data structure on the basis of "ECMA-319 standard" will be described with reference to FIG. 3. Since the servo signals S2 to S5 have substantially the same data structure as the servo signal S1, detailed description thereof will be omitted.

Figure 3:
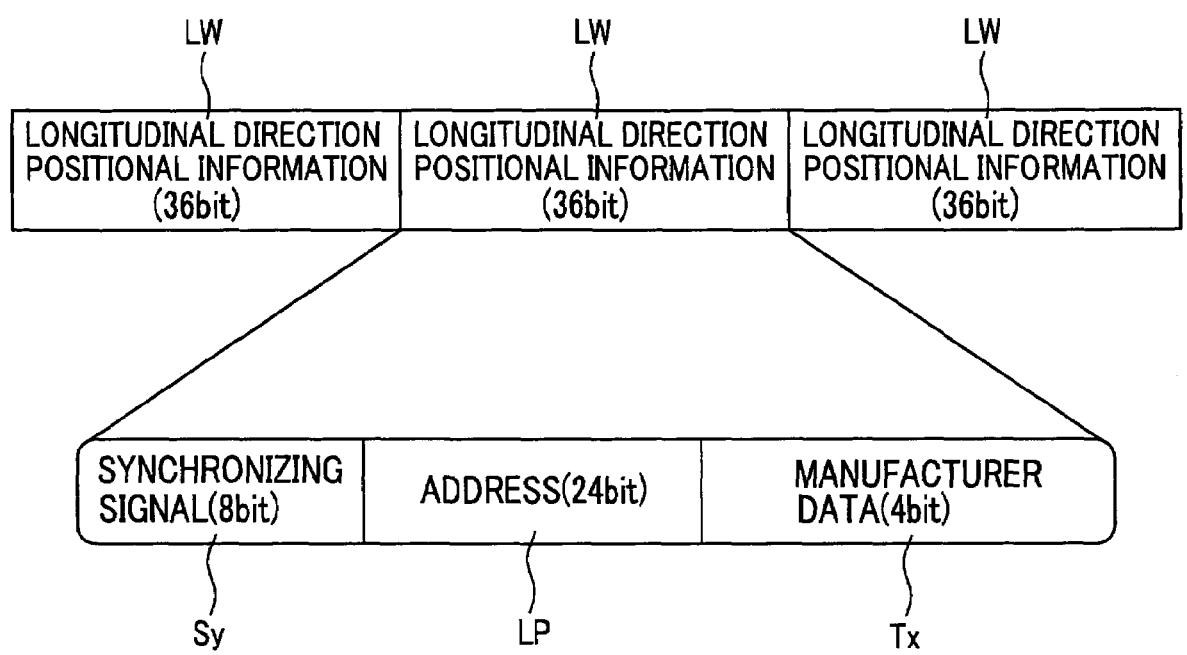
FIG. 3 is an explanatory view illustrating data structure embedded in the whole servo signal of FIG. 1.

As shown in FIG. 3, the data embedded in the whole servo signal S1 includes a plurality of longitudinal direction positional information (LPOS Word) LW, each of which consists of 36 servo patterns 1, 2, i.e. 36 bit data. The longitudinal direction positional information LW consists of 8 bit synchronizing signal (Sync mark) Sy for indicating the head position, an address (Longitudinal position) LP containing six 4 bit data for indicating the longitudinal position of the tape, and 4 bit manufacturer information construction data (Manufacturer Data) Tx.

Figure 4:
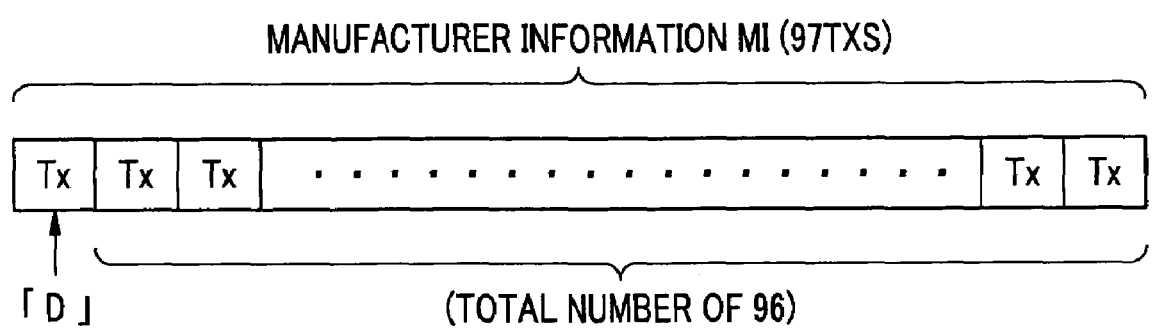
FIG. 4 is an explanatory view illustrating the manufacturer information as an assembly of manufacturer data of FIG. 3.

As shown in FIG. 4, by reading the 97 longitudinal direction positional information LW the manufacturer data Tx is recognized as one manufacturer information MI. The manufacturer data Tx is constructed by writing on the head of the manufacturer data Tx the data indicating the head position (e.g. 4 bit data to become "0001" is converted by a certain table to indicate the data of "D"), and by writing on the following 96 manufacturer data Tx arbitrary data other than the "D" (e.g. 0, 1, . . . , 9, A, B, C). Embedded in the 96 manufacturer data Tx are data such as a manufacturer ID, a manufacturing data information of the tape, a serial number of the tape, a servo writer ID, and an operator ID, and servo band information indicating any one of the five servo bands SB1 to SB5.

Figure 5:
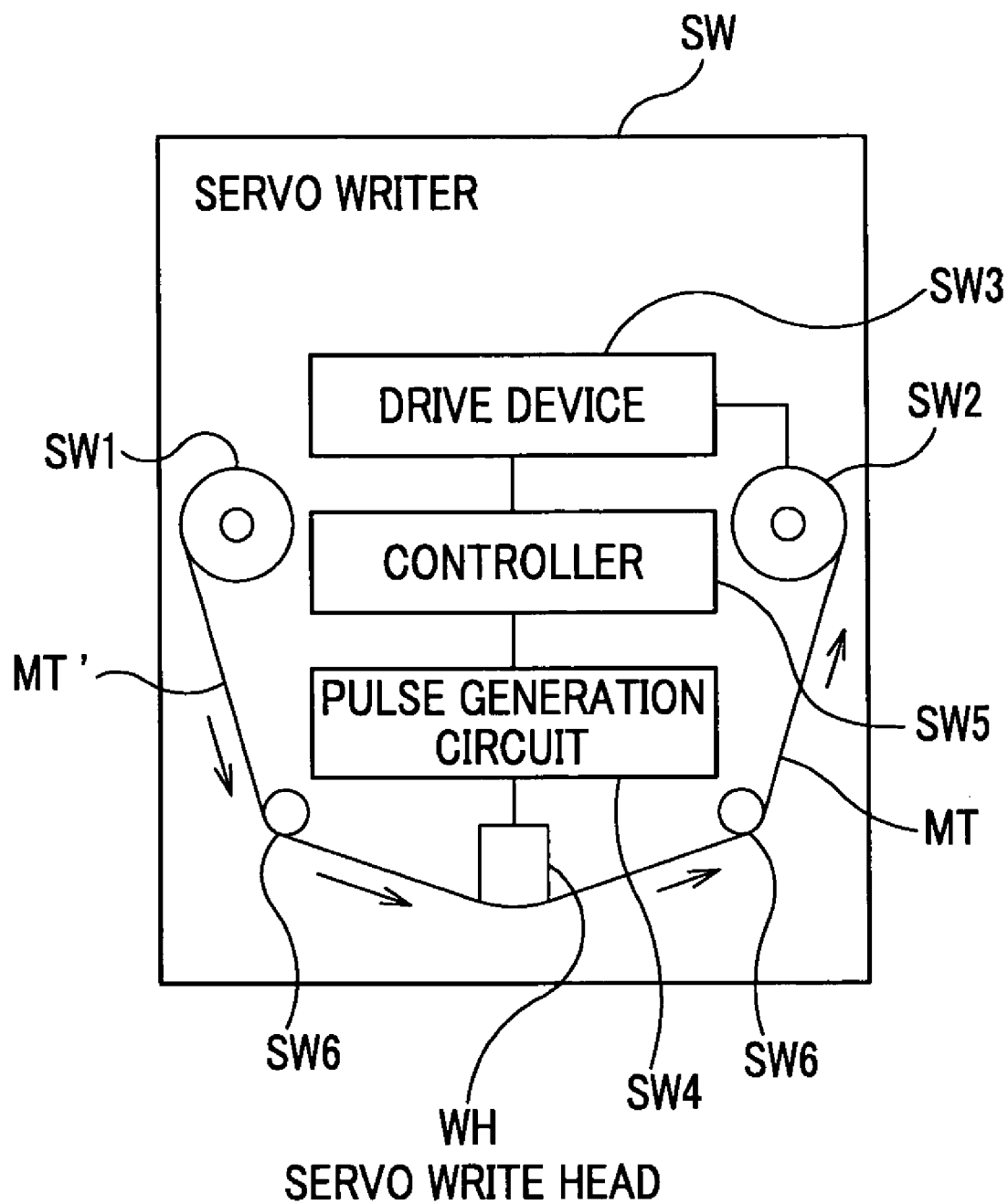
FIG. 5 is a block diagram illustrating a servo writer according to the present invention.
Figure 6:
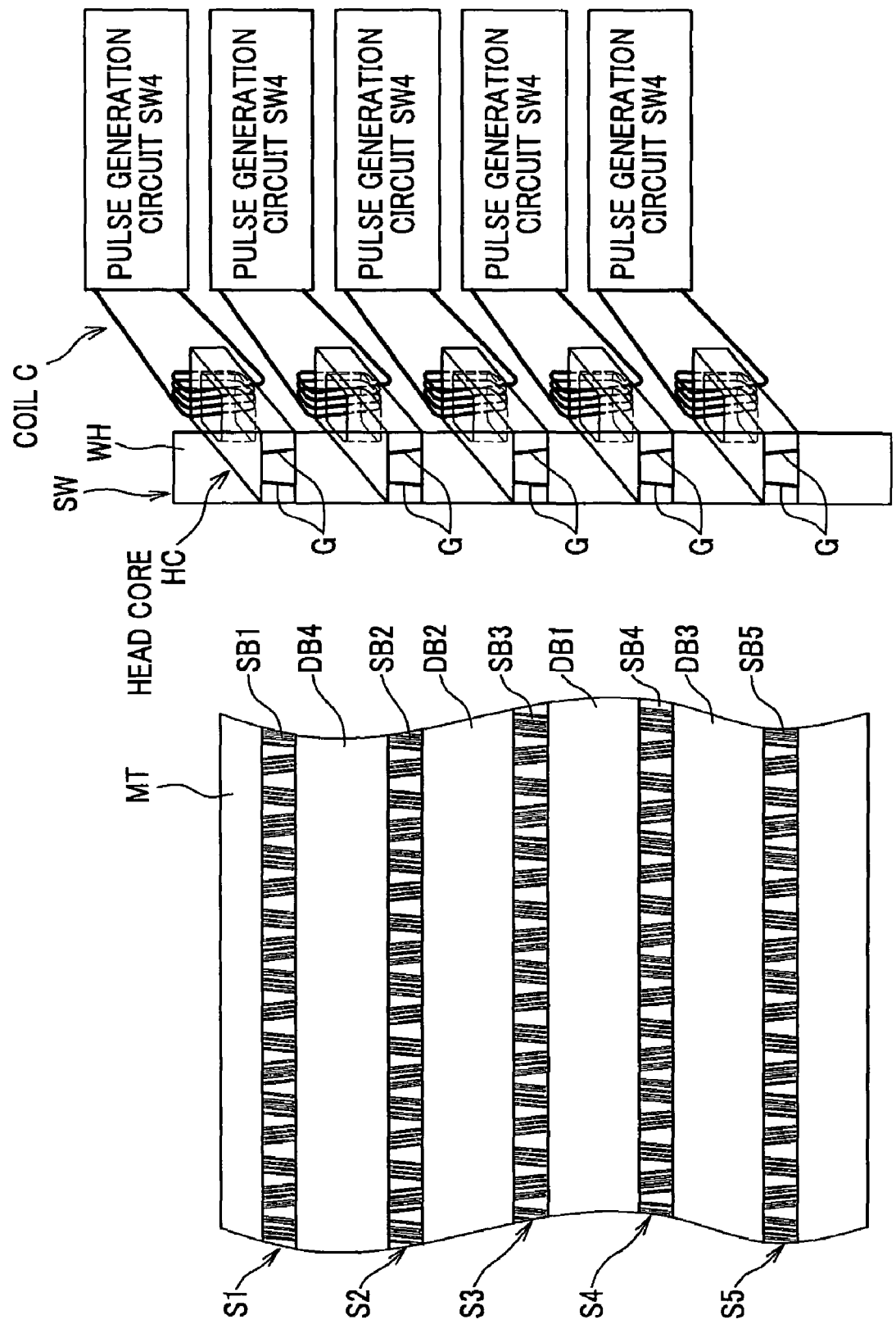
FIG. 6 is a plan view illustrating a servo write head of the servo writer shown in FIG. 5.

With reference to FIGS. 5 and 6, description will be given of a servo writer SW for writing servo signals S1 to S5 on the magnetic tape MT.

As seen in FIG. 5, the servo writer SW mainly includes a supply reel SW1, a take-up reel SW2, a drive device SW3, a pulse generation circuit SW4, a servo write head WH, and a controller SW5. Further, the servo writer SW is equipped with a power supply (not shown), a cleaning device (not shown) for cleaning the magnetic tape MT, and a verify device for checking written servo signals S1 to S5.

Prior to writing servo signals S1 to S5, a raw and wide web magnetic tap in the form of a roll is cut along its longitudinal direction to prepare a magnetic tape roll MT' having a large diameter. The magnetic tape roll MT' set on the supply reel SW1 is fed out upon writing servo signals S1 to S5. The magnetic tape MT' fed out from the supply reel SW1 is guided by guides SW6 and travels to the servo write head WH. After the servo write head WH writes servo signals S1 to S5 on the magnetic tape MT, the magnetic tape MT is guided by the guides SW6 and travels to the take-up reel SW2. The take-up reel SW2 is rotatively driven by the drive device SW3 so as to take up the magnetic tape MT on which is written servo signals S1 to S5.

The drive device SW3 rotatively drives the take-up reel SW2. The drive device SW3 includes a motor (not shown), a motor drive circuit (not shown) for supplying an electric current to the motor, gears (not shown) for connecting the motor shaft and the take-up reel SW2. The drive device SW3 generates a motor current at a motor drive circuit on the basis of a motor current signal from the controller SW5, and supplies the motor current to the motor. Further, the drive device SW3 transmits the rotating force of the motor to the take-up reel SW2 through the gears, and rotatively drives the take-up reel SW2.

The supply reel SW1, the take-up reel SW2, the drive device SW3, and the guides SW6 correspond to the magnetic tape running mechanism defined in the claims.

The pulse generation circuit SW4 is a circuit for supplying a recording pulse current to a plurality of coils C (FIG. 6) provided in the servo write head WH on the basis of a pulse control signal from the controller SW5. The pulse generation circuit SW4 is provided independently for each coil C. To be more specific, based on the pulse control signal from the controller SW5, the pulse generation circuit SW4 alternately generates a pulse current having either plus or minus polarity and a zero current and writes the first servo pattern 1 or the second servo pattern 2 on a predetermined position of each servo band SB1 to SB5. The current value of the recording pulse current is sufficient to magnetize the magnetic layer of the magnetic tape MT' by means of the leakage flux from a gap pattern G (FIG. 6), and is determined in consideration of characteristics of the coil C (FIG. 6) of the servo write head WH.

As shown in FIG. 6, the servo write head WH has a plurality pairs of nonparallel gap patterns G, G . . . which are formed in the position corresponding to each servo band SB1 to SB5. The servo write head WH records the servo signals S1 to S5 by these gap patterns G.

It should be noted that each of the gap patterns G arranged at equally spaced intervals along the width direction of the tape has to be accurately defined in terms of the position in the tape width direction. However, it is not necessary to accurately define each of the gap patterns G in terms of the position in the tape longitudinal direction, which allows some deviation against other gap patterns G. This is because even if the gap patterns G are deviated along the longitudinal direction of the tape and the servo signals S1 to S5 are slightly deviated to each other, the servo band SB1 can be specified only by referring to one servo signal S1. According to the present invention, unlike the conventional art, it is not necessary to provide the servo write head with gaps that are accurately offset. This leads to a decrease in the manufacturing cost of the servo write head WH.

Head cores HC are independently provided for each gap pattern G. Each head core HC is wound by coil C. The pulse generation circuit SW4 connected to each coil C converts the data that is encoded by the controller SW5 (FIG. 5) to distinct each of the servo bands SB1 to SB5 into a recording current pattern, and supplies this recording current pattern to the coil C. Japanese Laid-open Patent Application No.10-334435 discloses an example of the data encoding method. Accordingly, a characteristic ID is embedded in each servo signal S1 to S5 in accordance with the respective servo bands SB1 to SB5.

Timing for supplying a recording current from each electric circuit to the corresponding head core HC may be set arbitrarily. For example, in the case where a recording current is supplied from each pulse generation circuit SW4 to the corresponding head core HC in a synchronous manner, the positional relation of the servo signals S1 to S5 along the longitudinal direction of the tape depends on the positions of the respective gap patterns G along the longitudinal direction of the tape. However, even if the servo signals S1 to S5 are formed along the longitudinal direction of the tape in a manner deviated to each other, any problems do not occur for the reasons previously described. Also, in the case where a recording current is supplied in a non-synchronous manner, the servo signals S1 to S5 may be deviated to each other along the longitudinal direction of the tape due to a random phase difference occurred in the pattern of the recording current. This does not also cause any problems for the reasons previously described.

With reference to FIG. 5, description will be given of the method of writing servo signals S1 to S5 on the magnetic tape MT by the use of the servo writer SW.

As shown in FIG. 5, while the magnetic tape running mechanism starts to feed the magnetic tape MT, the pulse generation circuits SW4 shown in FIG. 6 supply predetermined recording current patterns to the corresponding coils C wound around the head cores HC of the servo write head WH. When a recording current is supplied to each head core HC, the servo signals S1 to S5 are recorded on the respective servo bands SB1 to SB5 by the gap patterns G. Therefore, different servo band information is embedded in the recorded servo signals S1 to S5.

Figure 7:
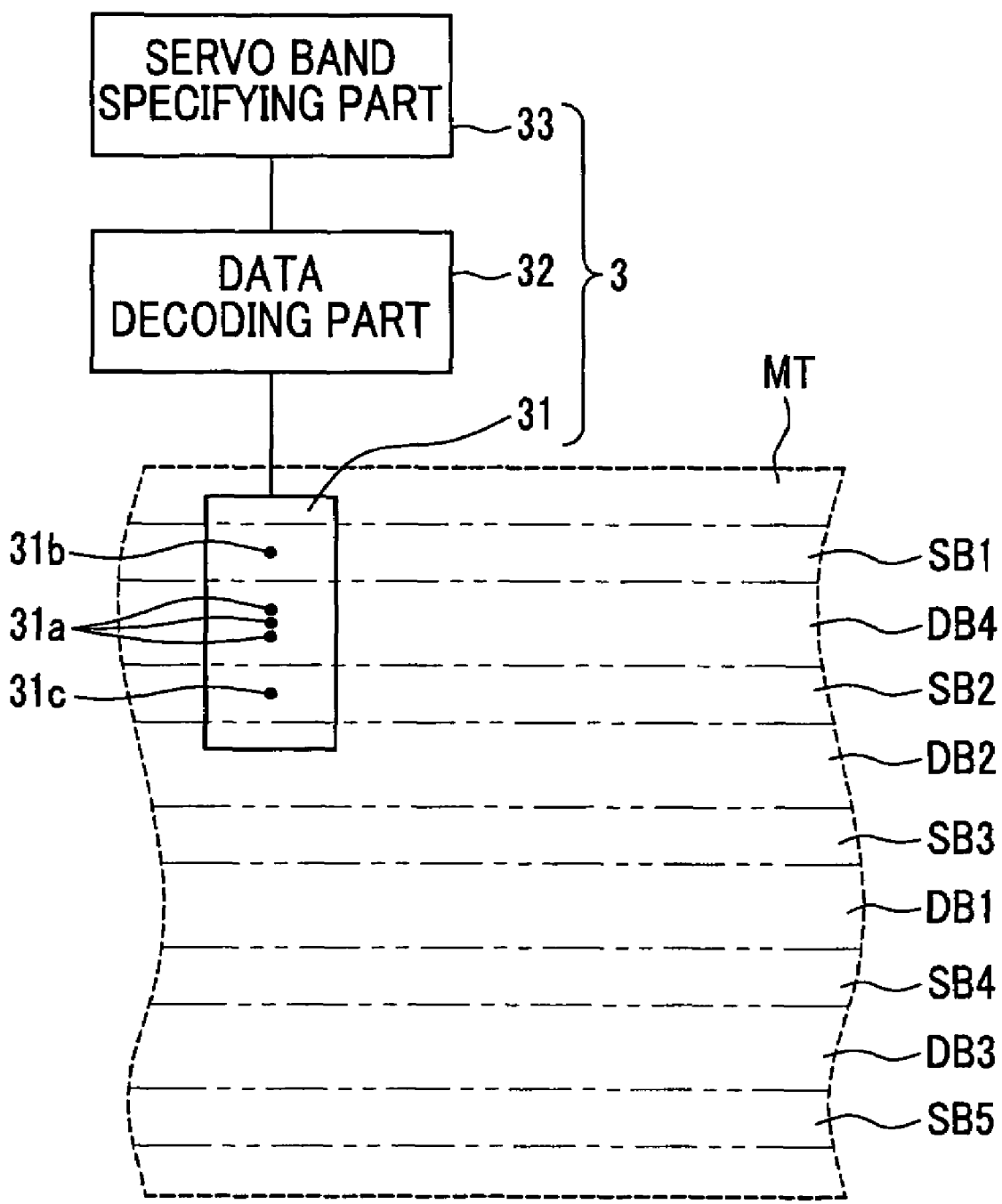
FIG. 7 is a plan view illustrating a recording/reproducing apparatus as an example of the servo band specifying apparatus according to the present invention.

With reference to FIG. 7, description will be given of a recording/reproducing apparatus as one example of a servo band specifying apparatus according to the present invention.

As shown in FIG. 7, the recording/reproducing apparatus 3 mainly includes a head unit 31, a data decoding part 32 as a servo band specifying part, and a servo band specifying part 33. The head unit 31 mainly includes a plurality of heads 31a for recording/reproducing data on the data bands DB1 to DB4, a servo read head 31b for reading the servo signals S1 to S5 (FIG. 1) written on the servo bands SB1 to SB5, and a reserve servo read head 31c.

The servo read head 31b mainly reads out a pulse signal of the servo signals S1 to S5 written on the servo bands SB to SB5. The reserve servo read head 31c is used, for example, when the servo read head 31b malfunctions or temporarily or permanently jams. The reserve servo read head 31c also functions to read the servo signals S1 to S5 likewise the servo read head 31b.

The data decoding part 32 decodes one servo signal that is read out by the servo read head 31b or the reserve servo read head 31c, such as data (encoded for specifying the servo bands SB1 to SB5) embedded in the servo signal S1.

The servo band specifying part 33 specifies the servo bands SB1 to SB5 based on a signal outputted from the data decoding part 32.

Next, description will be given of the method of specifying a servo band by means of the recording/reproducing apparatus 3.

As seen in FIG. 7, when the servo read head 31b positions on the servo band SB1, the whole servo signal S1 written on the servo band SB1 is read out by the servo read head 31b. The thus read out servo signal S1 is outputted to the data decoding part 32 and decoded. During the decoding process, only the data indicating the servo band information is extracted from the 96 manufacturer data Tx and decoded. For example, two data "0" "0" are extracted from a predetermined position in the 96 manufacturer data Tx, and the data are converted (decoded) by a certain table to produce the data of "A".

When the servo band information as the decoded data is outputted to the servo band specifying part 33, the servo band specifying part 33 specifies the servo band SB1 where the servo signal S1 positions. Other servo bands SB2 to SB4 are also specified based on the data read out by the servo read head 31b. In the case of a malfunction of the servo read head 31b, each of the servo bands SB2 to SB5 are specified based on the data read out by the reserve servo read head 31c.

According to the aforementioned embodiments of the present invention, because data indicating the respective servo bands SB1 to SB5 are embedded in the corresponding servo signals S1 to S5 written on a plurality of servo bands SB1 to SB5, it is possible to specify the servo band without comparing the servo signals written on the adjacent servo bands. Further, because the servo band can be specified from one servo signal, even if one servo read head 31b malfunctions, another reserve servo read head 31c can specify, for example, the servo band SB2, to thereby reliably determine that the head unit 31 positions on the data band DB4.

While the present invention has been described in detail with reference to specific embodiments thereof, it will be apparent to one skilled in the art that various changes and modifications may be made without departing from the scope of the claims.

In the above embodiment, two kinds of servo patterns 1, 2 are formed by varying the space of the five nonparallel patterns P1 to P5. However, the present invention is not limited to this specific embodiment. For example, as shown in FIG. 8, the first servo pattern 1 may be formed such that the nonparallel patterns P1 to P5 in the first subframe 11 position at equally spaced intervals. Meanwhile, the second servo pattern 2 may be formed such that the width (length along the longitudinal direction of the tape) of the first nonparallel pattern P1 and the fifth nonparallel pattern P5 in the first subframe 21 becomes wider. By this arrangement of the nonparallel patterns, two different kinds of servo patterns 1, 2 can be formed. This allows the servo band information to be embedded in the servo signals S1 to S5 likewise in the case of the above embodiment.

Varying the width of the nonparallel patterns can be readily made by increasing or decreasing time for applying a recording pulse current. Size of the width can be set arbitrarily such that the width of the first nonparallel pattern P1 and the fifth nonparallel pattern P5 becomes smaller than the other patterns.

In the above preferred embodiment, two servo read heads 31b, 31c are provided. However, the present invention is not limited to this specific number and the number of servo read heads can be set arbitrarily, as long as at least one servo read head is employed. Although one servo band specifying part and one data decoding part may be sufficient, the number thereof may be the same as that of the servo read heads. The data structure of FIGS. 3 and 4 shows one example, and the data structure is not limited to this embodiment. For example, instead of embedding the LPOS and manufacturer information in the servo signal, only the servo band information may be embedded in the servo signal.

The servo band may be previously DC erased (magnetized in one direction). In other words, the servo signal may be written in the reverse direction on a servo band that has been magnetized in any one direction along the longitudinal direction of the magnetic tape. This can improve the signal-to-noise ratio of the read out servo signal, which can reliably read the servo band information embedded in the servo signal. As disclosed in Japanese Laid-open Patent Application No.8-30942 (columns [0027] and [0028]), the manner of embedding the data in the servo band may be achieved by extending or narrowing the spacing interval. For example, information may be embedded in the servo signal by extending or narrowing the space (spacing interval) between the first subframe consisting of a pair of five line patterns and the second subframe consisting of a pair of four line patterns. It may be possible to write information between the first subframe and the second subframe.

What is claimed is:

1. A magnetic tape comprising:
   a plurality of servo bands on each of which is written a different servo signal for tracking control of a magnetic head, and
   data is embedded in each servo signal for specifying the servo band corresponding to the data,
   wherein reading the data enables a servo read head of the magnetic head to specify on which servo band the servo read head is currently positioned without referring to other servo bands.

2. A magnetic tape according to claim 1, wherein the servo signal consists of a plurality of continuous patterns sets each of which pattern is nonparallel stripes, and the data is embedded in the servo signal by shifting a pair of nonparallel stripes along the longitudinal direction of the magnetic tape.

3. A method of manufacturing a magnetic tape of claim 2 comprising:
   a first step of encoding data for specifying a servo band where the servo signal positions:
   a second step of converting the data that is encoded in the first step into a recording pulse current; and
   a third step of supplying the recording pulse current to the servo write head and writing on the servo band of the magnetic tape a servo signal in which is embedded the encoded data.

4. A servo writer used for manufacturing a magnetic tape of claim 2, comprising:
   a magnetic tape running mechanism for taking up with a take-up reel the magnetic tape that is fed out from a supply reel;
   a servo write head for writing a servo signal on a servo band of the magnetic tape in a manner contacting with the magnetic tape while the magnetic tape is running;
   a controller for encoding data for specifying a servo band where the servo signal positions; and
   a pulse generation circuit for converting the encoded data outputted from the controller into a recording pulse current, and for supplying the recording pulse current to a coil of the servo write head.

5. A magnetic tape according to claim 1, wherein the servo signal consists of a plurality of continuous patterns sets each of which pattern is nonparallel stripes, and the data is embedded in the servo signal by varying a width of a pair of nonparallel stripes.

6. A method of manufacturing a magnetic tape of claim 5 comprising:
   a first step of encoding data for specifying a servo band where the servo signal positions:
   a second step of converting the data that is encoded in the first step into a recording pulse current; and
   a third step of supplying the recording pulse current to the servo write head and writing on the servo band of the magnetic tape a servo signal in which is embedded the encoded data.

7. A servo writer used for manufacturing a magnetic tape of claim 5, comprising:
   a magnetic tape running mechanism for taking up with a take-up reel the magnetic tape that is fed out from a supply reel;
   a servo write head for writing a servo signal on a servo band of the magnetic tape in a manner contacting with the magnetic tape while the magnetic tape is running;
   a controller for encoding data for specifying a servo band where the servo signal positions; and
   a pulse generation circuit for converting the encoded data outputted from the controller into a recording pulse current, and for supplying the recording pulse current to a coil of the servo write head.

8. A magnetic tape according to claim 1, wherein the servo signal consists of a plurality of continuous patterns sets each of which pattern is nonparallel stripes, and the data is embedded in the servo signal by changing a spacing interval between adjacent continuous patterns sets.

9. A magnetic tape according to claim 1, wherein the servo bands are previously DC erased.

10. A method of manufacturing a magnetic tape of claim 1 comprising:
    a first step of encoding data for specifying a servo band where the servo signal positions:
    a second step of converting the data that is encoded in the first step into a recording pulse current; and
    a third step of supplying the recording pulse current to the servo write head and writing on the servo band of the magnetic tape a servo signal in which is embedded the encoded data.

11. A servo writer used for manufacturing a magnetic tape of claim 1, comprising:
    a magnetic tape running mechanism for taking up with a take-up reel the magnetic tape that is fed out from a supply reel;
    a servo write head for writing a servo signal on a servo band of the magnetic tape in a manner contacting with the magnetic tape while the magnetic tape is running;
    a controller for encoding data for specifying a servo band where the servo signal positions; and
    a pulse generation circuit for converting the encoded data outputted from the controller into a recording pulse current, and for supplying the recording pulse current to a coil of the servo write head.

12. A magnetic tape according to claim 1, wherein the servo signal consists of a plurality of continuous patterns sets each of which pattern is nonparallel stripes, and the data is embedded in the servo signal by varying the thickness of said stripes.

13. A magnetic tape according to claim 1, wherein specifying the servo band is for accurate tracing of a magnetic head position, and is carried out on a single servo band.

14. A magnetic tape according to claim 1, wherein a plurality of servo bands are arranged along the width of the magnetic tape, and a position of one servo band along the width of the magnetic tape can be specified from the data written on this one servo band.

15. A magnetic tape according to claim 14, wherein different data is written on each of the plurality of servo bands.

16. A magnetic tape according to claim 1, wherein the servo signal consists of a plurality of continuous patterns sets each of which pattern is nonparallel stripes, and the data is embedded in the servo signal by varying a width of each stripe of a pair of nonparallel stripes.

17. A magnetic tape according to claim 1, wherein the data is written as a part of manufacturer information.

18. A method of specifying a servo band from a plurality of servo bands formed on a magnetic tape, comprising the steps of:
  reading data with a servo read head to specify on which servo band the servo read head is currently positioned, each of the plurality of servo bands having a different servo signal in which the data is embedded; and
  specifying the servo band on which the servo read head is currently positioned without referring to other servo bands.

19. A method of specifying a servo band according to claim 18, wherein the servo signal consists of a plurality of continuous patterns sets each of which pattern is nonparallel stripes, and the data is embedded in the servo signal by shifting a pair of nonparallel stripes along the longitudinal direction of the magnetic tape.

20. A method of specifying a servo band according to claim 18, wherein the servo signal consists of a plurality of continuous patterns sets each of which pattern is nonparallel stripes, and the data is embedded in the servo signal by varying a width of a pair of nonparallel stripes.

21. A method of specifying a servo band according to claim 18, wherein the servo signal consists of a plurality of continuous patterns sets each of which pattern is nonparallel stripes, and the data is embedded in the servo signal by changing a spacing interval between adjacent continuous patterns sets.

22. A method of specifying a servo band according to claim 18, wherein the servo bands are previously DC erased.

23. A method of specifying a servo band according to claim 18, wherein specifying the servo band is carried out by reading only one servo band.

24. A method of specifying a servo band according to claim 18, wherein the servo signal consists of a plurality of continuous patterns sets each of which pattern is nonparallel stripes, and the data is embedded in the servo signal by varying a width of each stripe of a pair of nonparallel stripes.

25. A method of specifying a servo band according to claim 18, wherein the data is written as a part of manufacturer information.

26. An apparatus for specifying a servo band from a plurality of servo bands formed on a magnetic tape, comprising:
  a servo read head for reading a servo signal written on one of the servo bands as well as for reading data that is embedded in each servo signal which is different from each other and written on the plurality of servo bands; and
  a servo band specifying section for specifying, without referring to other servo bands, on which servo band the servo read head is currently positioned, from the data to be read out by the servo read head.

27. An apparatus for specifying a servo band according to claim 26, wherein specifying the servo band is carried out by reading only one servo band.

28. An apparatus for specifying a servo band according to claim 26, further comprising:
  a reserve servo read head for use if said servo read head malfunctions.

29. An apparatus for specifying a servo band according to claim 28, wherein the servo read head and the reserve servo read head respectively read a different servo band.

30. An apparatus for specifying a servo band according to claim 28, wherein the servo read head and the reserve servo read head are provided in one head unit.

31. An apparatus for specifying a servo band according to claim 26, wherein the data is written as a part of manufacturer information.

* * * * *